(12) United States Patent
Hagan et al.

(10) Patent No.: US 10,378,381 B2
(45) Date of Patent: Aug. 13, 2019

(54) AIRFOIL WITH SKIN CORE COOLING

(71) Applicant: UNITED TECHNOLOGIES CORPORATION, Hartford, CT (US)

(72) Inventors: Benjamin F. Hagan, Manchester, CT (US); Ryan Alan Waite, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 285 days.

(21) Appl. No.: 15/022,943

(22) PCT Filed: Oct. 16, 2014

(86) PCT No.: PCT/US2014/060793
§ 371 (c)(1),
(2) Date: Mar. 18, 2016

(87) PCT Pub. No.: WO2015/061117
PCT Pub. Date: Apr. 30, 2015

(65) Prior Publication Data
US 2016/0230596 A1      Aug. 11, 2016

Related U.S. Application Data

(60) Provisional application No. 61/894,984, filed on Oct. 24, 2013.

(51) Int. Cl.
*F01D 25/12* (2006.01)
*F01D 9/04* (2006.01)
(Continued)

(52) U.S. Cl.
CPC ............ *F01D 25/12* (2013.01); *F01D 5/187* (2013.01); *F01D 9/041* (2013.01); *F01D 9/065* (2013.01);
(Continued)

(58) Field of Classification Search
CPC ...... F04D 29/542; F04D 29/5846; F01D 9/06; F01D 9/065; F01D 9/041; F01D 5/187; F01D 5/18; F01D 25/12; F01D 5/188; F01D 5/189; F05D 2240/81; F05D 2260/204
See application file for complete search history.

(56) References Cited

U.S. PATENT DOCUMENTS 3,388,888 A    6/1968   Kercher et al.
5,931,638 A    8/1999   Krause et al.
(Continued)

FOREIGN PATENT DOCUMENTS

EP        1544414 A1     6/2005
WO     2015030926 A1     3/2015

OTHER PUBLICATIONS

Supplementary European Search Report for European Application No. 14855974.3 dated Oct. 5, 2016.
(Continued)

*Primary Examiner* — Justin D Seabe
*Assistant Examiner* — Julian B Getachew
(74) *Attorney, Agent, or Firm* — Carlson, Gaskey & Olds, P.C.

(57) ABSTRACT

A gas turbine engine component has an airfoil extending radially inwardly of an outer platform to an inner platform. A central passage is formed within the airfoil and has an inlet end for receiving cooling air. An outlet end in the inner platform delivers cooling air to a downstream use. The airfoil has a suction wall and a pressure wall, and extends in an axial direction from a leading edge to a trailing edge. A suction skin core is between the central passage and the suction wall. A pressure skin core is between the central passage and the pressure wall.

8 Claims, 3 Drawing Sheets

(51) Int. Cl.
    *F04D 29/54* (2006.01)
    *F04D 29/58* (2006.01)
    *F01D 5/18* (2006.01)
    *F01D 9/06* (2006.01)

(52) U.S. Cl.
    CPC ....... *F04D 29/542* (2013.01); *F04D 29/5846* (2013.01); *F05D 2220/32* (2013.01); *F05D 2240/81* (2013.01); *F05D 2260/202* (2013.01); *F05D 2260/204* (2013.01); *Y02T 50/676* (2013.01)

(56) References Cited

U.S. PATENT DOCUMENTS

| | | | |
|---|---|---|---|
| 7,527,470 B2 | 5/2009 | Guimbard et al. | |
| 8,096,766 B1* | 1/2012 | Downs | F01D 5/147 416/96 A |
| 8,137,068 B2* | 3/2012 | Surace | B22C 7/02 164/44 |
| 2005/0025623 A1 | 2/2005 | Botrel et al. | |
| 2005/0281667 A1 | 12/2005 | Liang | |
| 2010/0129195 A1 | 5/2010 | Surace et al. | |
| 2010/0221121 A1* | 9/2010 | Liang | F01D 5/187 416/97 R |
| 2011/0236221 A1 | 9/2011 | Campbell | |

OTHER PUBLICATIONS

International Search Report from corresponding PCT/US14/60793.
International Preliminary Report on Patentability for International Application No. PCT/US2014/060793 dated May 6, 2016.

* cited by examiner

AIRFOIL WITH SKIN CORE COOLING

CROSS-REFERENCE TO RELATED APPLICATION

This application claims priority to U.S. Provisional Application No. 61/894,984, filed Oct. 24, 2013.

STATEMENT REGARDING FEDERALLY SPONSORED RESEARCH OR DEVELOPMENT

This invention was made with government support under Contract No. FA8650-09-D-2923 0021, awarded by the United States Air Force. The Government has certain rights in this invention.

BACKGROUND OF THE INVENTION

This application relates to a gas turbine engine component having an airfoil and with a central cooling air passage for directing cooling air to another location.

Gas turbine engines are known and typically include a fan delivering air into a compressor. The air is compressed and then delivered into a combustor section where it is mixed with fuel and ignited. Products of this combustion pass downstream over turbine rotors driving them to rotate.

The products of combustion are quite hot and, thus, a good deal of cooling air is provided to components in a gas turbine engine. In the turbine section, there are rotating blades and static vanes having airfoils. Complex cooling schemes are utilized to cool the airfoils.

In addition, the airfoils, and in particular the static vanes, are utilized as cooling air supply passages for directing cooling air from a source to a downstream use. However, since the components are exposed to the high temperatures of the products of combustion, the temperature of this cooling air may be compromised.

SUMMARY OF THE INVENTION

In a featured embodiment, a gas turbine engine component has an airfoil extending radially inwardly of an outer platform to an inner platform. A central passage is formed within the airfoil and has an inlet end for receiving cooling air. An outlet end in the inner platform delivers cooling air to a downstream use. The airfoil has a suction wall and a pressure wall, and extends in an axial direction from a leading edge to a trailing edge. A suction skin core is between the central passage and the suction wall. A pressure skin core is between the central passage and the pressure wall.

In another embodiment according to the previous embodiment, the central passage extends axially between an end spaced toward the leading edge and an end spaced towards a trailing edge. At least one of the skin cores extends axially beyond each of the ends.

In another embodiment according to any of the previous embodiments, both of the skin cores extend axially beyond both of the ends of the central passage.

In another embodiment according to any of the previous embodiments, both the suction skin core and pressure skin core have bumps extending toward each other between the leading edge end of the central passage and the leading edge.

In another embodiment according to any of the previous embodiments, the bumps are separated by a separating wall.

In another embodiment according to any of the previous embodiments, the suction wall skin core passes air outwardly of outlets adjacent the trailing edge of the airfoil.

In another embodiment according to any of the previous embodiments, an air inlet communicates with both the pressure and the suction skin cores.

In another embodiment according to any of the previous embodiments, there is a separate inlet providing cooling air to each of the pressure side and the suction side skin cores.

In another embodiment according to any of the previous embodiments, the component is a static vane.

In another embodiment according to any of the previous embodiments, at least one of the suction skin core and the pressure skin core have axially extending ribs extending between the central passage and one of the suction and pressure walls.

In another embodiment according to any of the previous embodiments, the suction wall skin core passes air outwardly of outlets adjacent the trailing edge of the airfoil.

In another embodiment according to any of the previous embodiments, an air inlet communicates with both the pressure and the suction skin cores.

In another embodiment according to any of the previous embodiments, there is a separate inlet providing cooling air to each of the pressure side and the suction side skin cores.

In another embodiment according to any of the previous embodiments, the component is a static vane.

In another embodiment according to any of the previous embodiments, at least one of the suction skin core and the pressure skin core have axially extending ribs extending between the central passage and one of the suction and pressure walls.

In another embodiment according to any of the previous embodiments, the ribs direct airflow in the axial direction.

In another embodiment according to any of the previous embodiments, the suction skin core and the pressure skin core are thinner in a direction measured between the suction wall and the pressure wall than is the central passage.

In another featured embodiment, a gas turbine engine has a compressor section and a turbine section, with each of the compressor and turbine sections including components with an airfoil. The component with an airfoil extends radially inwardly of an outer platform to an inner platform. A central passage formed within the airfoil has an inlet end for receiving cooling air and an outlet end in the tip for delivering the cooling air to a downstream use. The airfoil has a suction wall and a pressure wall, and extends in an axial direction from a leading edge to a trailing edge. A suction skin core is between the central passage and the suction wall. A pressure skin core is spaced between the central passage and the pressure wall.

In another embodiment according to the previous embodiment, the central passage extends axially between an end spaced toward the leading edge and an end spaced towards a trailing edge, and at least one of the skin cores extends axially beyond each of the ends.

In another embodiment according to any of the previous embodiments, both of the skin cores extend axially beyond both of the ends of the central passage.

These and other features may be best understood from the following drawings and specification.

DETAILED DESCRIPTION

Figure 1:
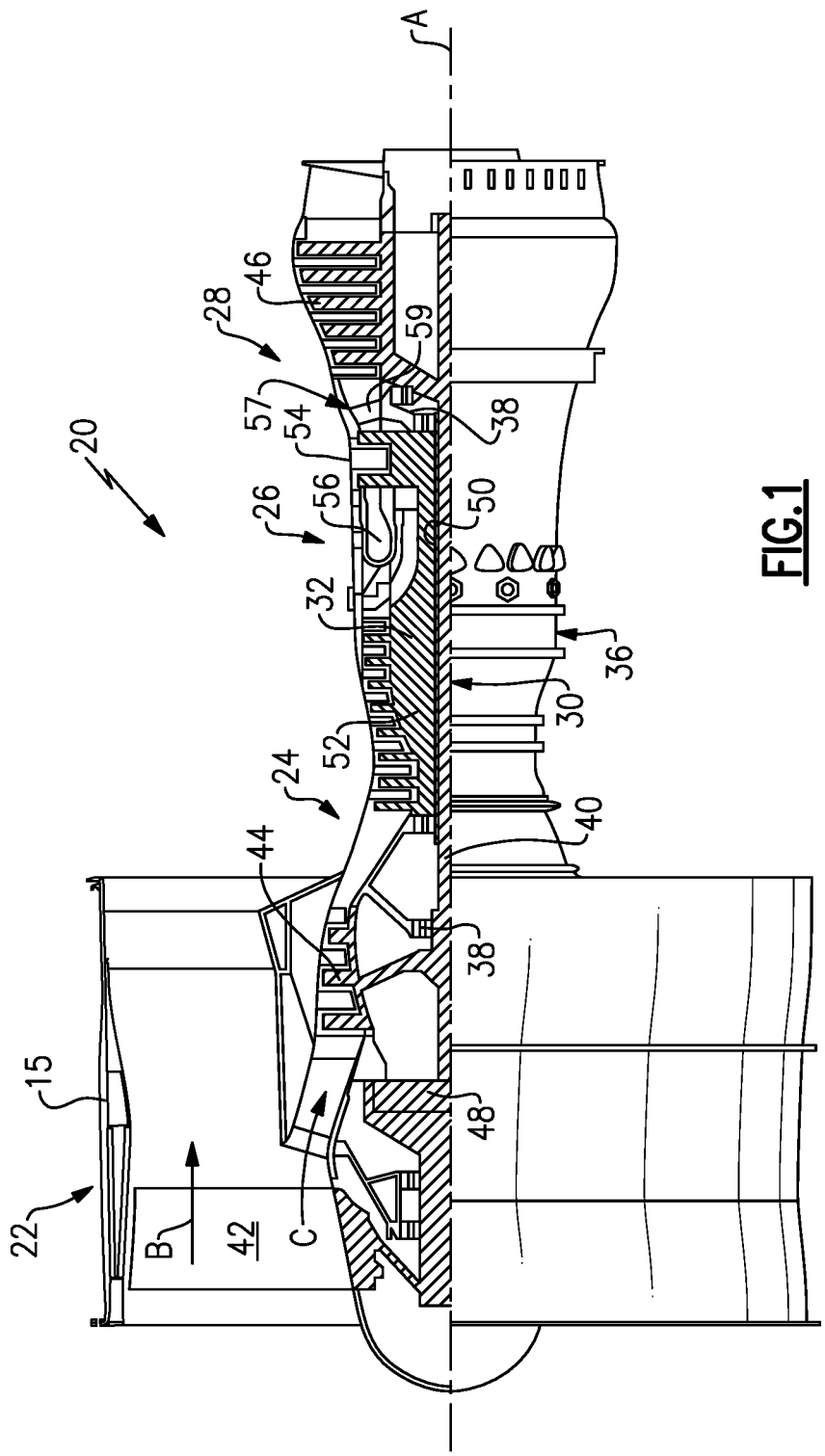
FIG. 1 shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2A:
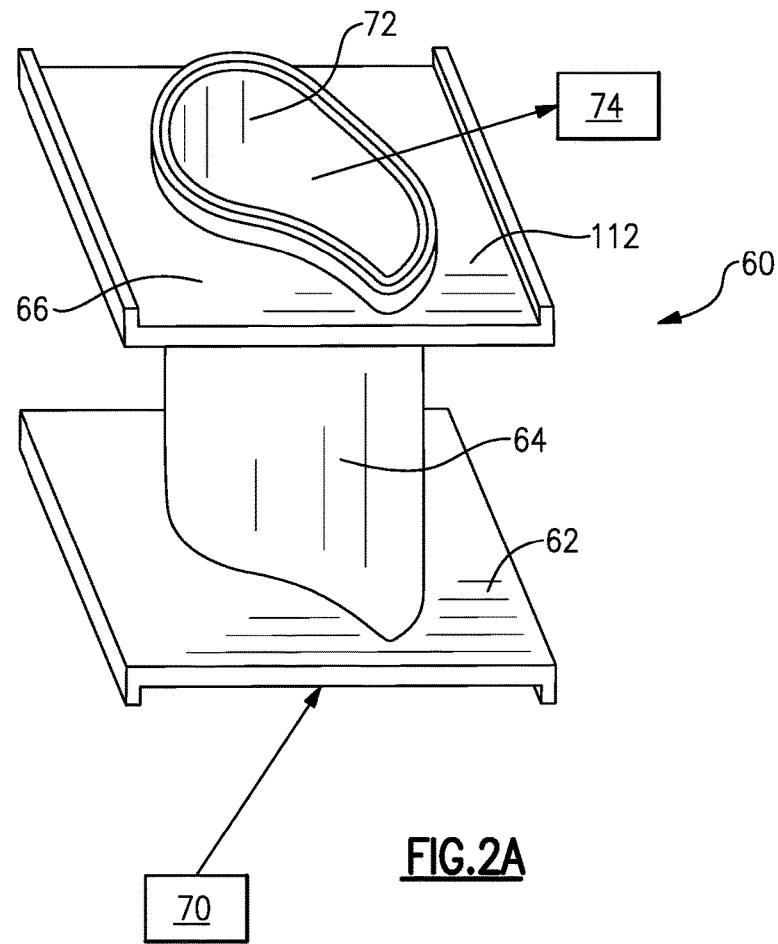
FIG. 2A schematically shows a component within the gas turbine engine.
Figure 2B:
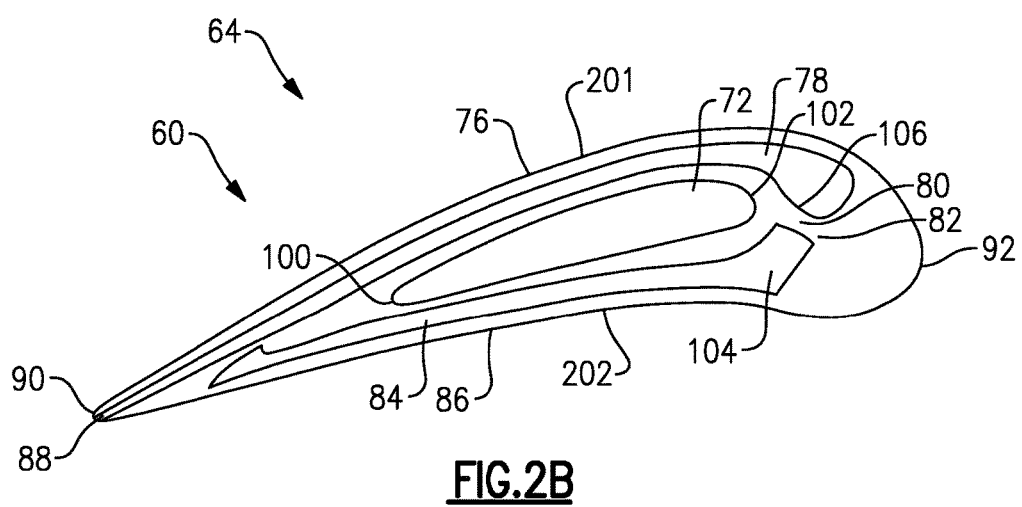
FIG. 2B is a cross-sectional view along line B-B of FIG. 2C.
Figure 2C:
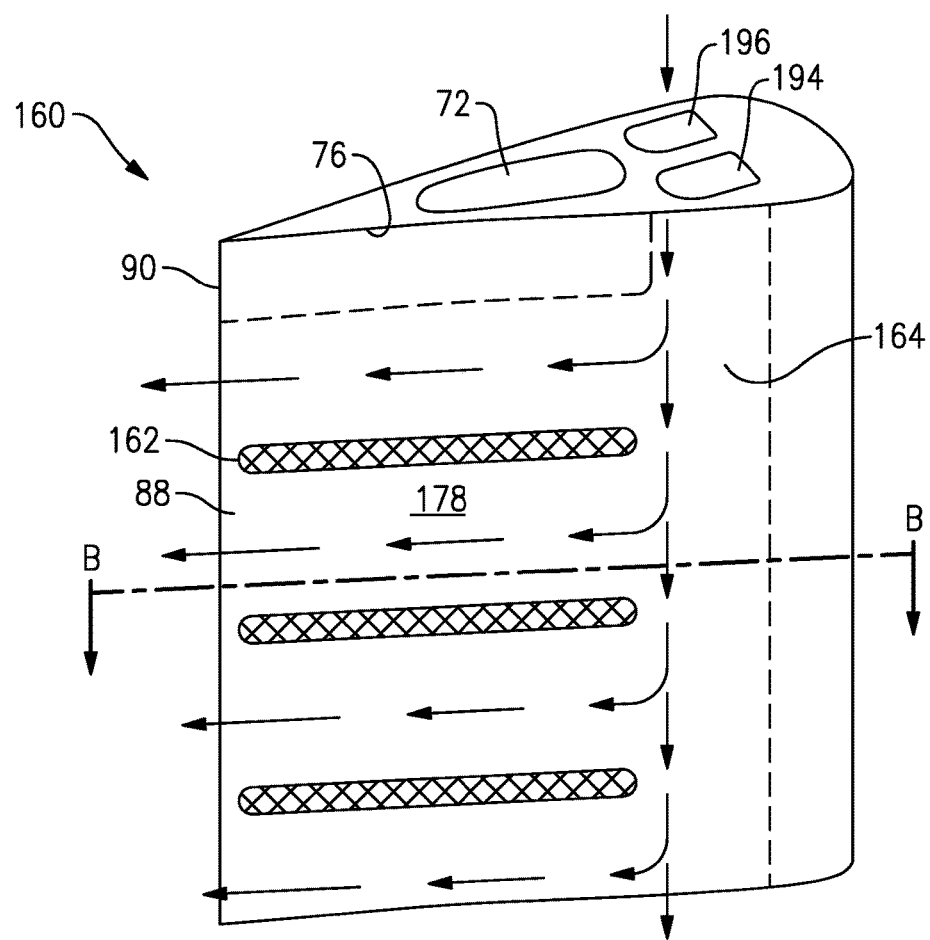
FIG. 2C shows another feature of the gas turbine engine component.

FIGS. 2A-C show a component which may be a vane 60, such as utilized in the turbine section of the engine 20 of FIG. 1. As known, the vane 60 has an airfoil 64 extending radially inwardly from a platform 62. A platform 66 is defined at an end of the airfoil 64 remote from platform 62. Platform 66 will typically be at a radially inner end of vane 60 when mounted in an engine.

A cooling air supply 70 directs cooling air to a central passage 72 through an inlet 111, the airfoil 64, and to an outlet 112 in platform 66 and to a downstream use 74. The downstream use 74 may be housing structure, turbine structure or any number of other locations which require cooling air. Another use may be to pressurize a downstream cavity in order to prevent gas path injection back into the cavity. In the past, the temperature of this cooling air may have been compromised as it passed through the airfoil 64.

Thus, as shown in FIG. 2B, the central passage 72 is insulated by cooling air for cooling a skin 201, 202 on a suction wall 76 and a pressure wall 86, respectively, of the airfoil 64. As shown, the airfoil 64 extends from a trailing edge 90 to a leading edge 92. Skin core air inlets 194 and 196 (FIG. 2C) are provided adjacent the leading edge 92. As will be explained below, these inlets 194 and 196 communicate with a suction wall skin core 78 associated with suction wall 76, and a pressure wall skin core 84 associated with pressure wall 86. The suction wall skin core 78 is shown communicating with an outlet 88 adjacent the trailing edge 90. As is clear from the FIG. 2C, inlets 194 and 196 are spaced on a leading edge side of the central passage 72.

Air flows into the inlets 194 and 196 and into both of the skin cores 78 and 84. The skin cores not only cool the suction wall 76 and the pressure wall 86, but they also serve to insulate the air in the central passage 72. As shown, the central passage 72 extends from an end 100 spaced toward the trailing edge 90 to another end 102 spaced towards the leading edge 92. Both of the skin cores 78 and 84 extend axially (defined as between the leading edge 92 to the trailing edge 90), beyond the axial ends 100 and 102 of the central passage 72. In addition, as shown, each of the skin cores have bulged portions, or bumps, 104 and 106, which curve toward each other and are spaced by a central separating wall 80. These provide additional capacity for cooling flow to move radially down passage 164. As can be appreciated, skin cores 78 and 84 are thinner in a direction measured between suction wall 76 and pressure wall 86 than is the central passage 72.

FIG. 2C shows another embodiment wherein there are separate inlets 194 and 196 for the two skin cores 78 and 84. Thus, as shown, an inlet 194 communicates with a passage 164 and then with the skin core 78. In this embodiment, there are a plurality of ribs 162 formed within the skin core to provide additional structural support, and to provide heat transfer structure. As shown, the air exits through outlets 88 adjacent the trailing edge 90. In addition, the ribs are designed to direct flow in the axial direction from the leading edge to the trailing edge.

The skin cores 78 and 84 thus provide insulation to the central passage 72, such that the air is of a desirably low temperature when it reaches its downstream use 74.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine component comprising:
an outer platform and an inner platform, and an airfoil extending radially inwardly of said outer platform to said inner platform;
a central passage formed within said airfoil and having an inlet end in said outer platform for receiving cooling air and an outlet end in said inner platform for delivering cooling air to a downstream use;
said airfoil having a suction wall and a pressure wall, and said airfoil extending in an axial direction from a leading edge to a trailing edge;
a suction skin core between said central passage and said suction wall and a pressure skin core between said central passage and said pressure wall;
said central passage extends axially between a passage leading edge end spaced toward said leading edge and a passage trailing edge end spaced towards said trailing edge, and at least one of said skin cores extends axially beyond each of said ends;
at least one core inlet, separate of said central passage, which communicates with the pressure skin core and a second core inlet separate of said central passage, which communicates with the suction skin core to provide air to said pressure and suction skin cores;
wherein said core inlets are spaced towards said leading edge relative to said central passage;
wherein both of said skin cores extend axially beyond both of said ends of said central passage; and
wherein said suction skin core and said pressure skin core each having at least one bump extending toward the other of said suction skin core and said pressure skin core, respective, and between said passage leading edge end and said leading edge.

2. The gas turbine engine component as set forth in claim 1, wherein said bumps are separated by a separating wall.

3. The gas turbine engine component as set forth in claim 1, wherein said suction wall skin core passes air outwardly through outlets adjacent said trailing edge of said airfoil.

4. The gas turbine engine component as set forth in claim 1, wherein said component is a static vane.

5. The gas turbine engine component as set forth in claim 1, wherein at least one of said suction skin core and said pressure skin core have axially extending ribs extending between said central passage and one of said suction and pressure walls.

6. The gas turbine engine component as set forth in claim 5, wherein said ribs direct airflow in said axial direction.

7. The gas turbine engine component as set forth in claim 1, wherein said suction skin core and said pressure skin core are each thinner in a direction measured between said suction wall and said pressure wall than is said central passage.

8. The gas turbine engine as set forth in claim 1, wherein said downstream use may be cooling the housing or turbine structure, or pressurizing a downstream cavity to prevent gas path injection into the cavity.

* * * * *